(12) United States Patent
Reed et al.

(10) Patent No.: US 11,414,050 B2
(45) Date of Patent: Aug. 16, 2022

(54) MULTIMODE VEHICLE PROXIMITY SECURITY

(71) Applicant: Ford Global Technologies, LLC, Dearborn, MI (US)

(72) Inventors: Eric L. Reed, Livonia, MI (US); Jonathan Diedrich, Carleton, MI (US); John Moore, Canton, MI (US); Bradley Smith, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 641 days.

(21) Appl. No.: 15/666,677

(22) Filed: Aug. 2, 2017

(65) Prior Publication Data

US 2019/0039569 A1 Feb. 7, 2019

(51) Int. Cl.
| | |
|---|---|
| *B60R 25/24* | (2013.01) |
| *H04W 4/44* | (2018.01) |
| *H04W 12/06* | (2021.01) |
| *H04L 9/40* | (2022.01) |
| *H04W 12/64* | (2021.01) |
| *B60R 25/02* | (2013.01) |
| *B60R 25/06* | (2006.01) |
| *B60R 25/08* | (2006.01) |
| *G05D 1/00* | (2006.01) |
| *B60R 25/04* | (2013.01) |

(Continued)

(52) U.S. Cl.
CPC ............ *B60R 25/241* (2013.01); *B60R 25/02* (2013.01); *B60R 25/06* (2013.01); *B60R 25/08* (2013.01); *B60R 25/246* (2013.01); *G05D 1/0016* (2013.01); *H04L 63/0807* (2013.01); *H04W 4/44* (2018.02); *H04W 12/06* (2013.01); *H04W 12/64* (2021.01); *B60R 2025/0405* (2013.01); *H04L 67/12* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,373,149 B2 | 6/2016 | Abhyanker | |
| 9,412,278 B1 * | 8/2016 | Gong | G06F 16/29 |

(Continued)

FOREIGN PATENT DOCUMENTS

WO 2015037442 A1 3/2015

OTHER PUBLICATIONS

P. Neves, J. Soares and S. Sargento, "Media Independent Handovers: LAN, MAN and WAN Scenarios," 2009 IEEE Globecom Workshops, Honolulu, HI, 2009, pp. 1-6, doi: 10.1109/GLOCOMW.2009. 5360720. (Year: 2009).*

*Primary Examiner* — Peter D Nolan
*Assistant Examiner* — Michael F Whalen
(74) *Attorney, Agent, or Firm* — Frank A. MacKenzie; Bejin Bieneman PLC

(57) ABSTRACT

A computing device can be programmed to, upon determining that a location of a vehicle is within a set of boundaries associated with a wireless network and that a user device is authenticated to the network, authorize the user device to control the vehicle. The computing device can be further programmed to, upon determining that the vehicle is not within the boundaries, authorize the user device to control the vehicle based on transmitting an authentication credential to a server and receiving an authorization certificate.

19 Claims, 7 Drawing Sheets

(51) Int. Cl.
*H04L 67/12* (2022.01)
*H04W 84/12* (2009.01)

(56) References Cited

U.S. PATENT DOCUMENTS

| | | | |
|---|---|---|---|
| 9,563,998 B2 | 2/2017 | Hoyos et al. | |
| 9,792,613 B2* | 10/2017 | Gong | G05D 1/0022 |
| 2007/0165583 A1* | 7/2007 | Pecen | H04W 36/245 |
| | | | 370/338 |
| 2007/0185728 A1* | 8/2007 | Schwarz | G06Q 10/06 |
| | | | 701/36 |
| 2008/0154712 A1* | 6/2008 | Wellman | G06Q 10/06 |
| | | | 235/384 |
| 2012/0320892 A1* | 12/2012 | Moeller | H04W 4/021 |
| | | | 370/338 |
| 2013/0109375 A1* | 5/2013 | Zeiler | H04W 12/126 |
| | | | 455/426.1 |
| 2014/0240125 A1* | 8/2014 | Burch | G06Q 10/06 |
| | | | 340/539.13 |
| 2014/0351328 A1* | 11/2014 | Woods | H04W 4/021 |
| | | | 709/204 |
| 2015/0149265 A1 | 5/2015 | Huntzicker et al. | |
| 2015/0348335 A1 | 12/2015 | Ramanujam | |
| 2016/0006752 A1* | 1/2016 | Wilding | H04L 63/0245 |
| | | | 701/26 |
| 2016/0274578 A1 | 9/2016 | Arwine | |
| 2017/0213397 A1* | 7/2017 | Palmer | G07C 5/0808 |
| 2017/0330397 A1* | 11/2017 | Palmer | B60R 1/00 |
| 2018/0262891 A1* | 9/2018 | Wu | H04W 4/00 |
| 2019/0012922 A1* | 1/2019 | Selander | G08G 5/0034 |
| 2019/0375427 A1* | 12/2019 | Whitt | B60W 10/18 |
| 2020/0008059 A1* | 1/2020 | Fox | H04W 12/122 |
| 2020/0064865 A1* | 2/2020 | Lei | H04W 52/383 |
| 2020/0113015 A1* | 4/2020 | Basu Mallick | H04W 48/18 |
| 2021/0092604 A1* | 3/2021 | Fox | H04K 3/45 |

* cited by examiner

MULTIMODE VEHICLE PROXIMITY SECURITY

BACKGROUND

Vehicles can be equipped to operate in both autonomous and occupant piloted modes. Vehicles can be equipped with computing devices, networks, sensors and controllers to acquire information regarding the vehicle's environment and to pilot the vehicle based on the information. Safe and comfortable piloting of the vehicle can depend upon acquiring accurate and timely information regarding the vehicles' environment. Computing devices, networks, sensors and controllers can be equipped to analyze their performance, detect when information is not being acquired in an accurate and timely fashion, and take corrective actions including informing an occupant of the vehicle, relinquishing autonomous control or parking the vehicle. Computing device can also determine whether occupants are authorized to use or pilot a vehicle by acquiring authentication information.

DETAILED DESCRIPTION

Figure 1:
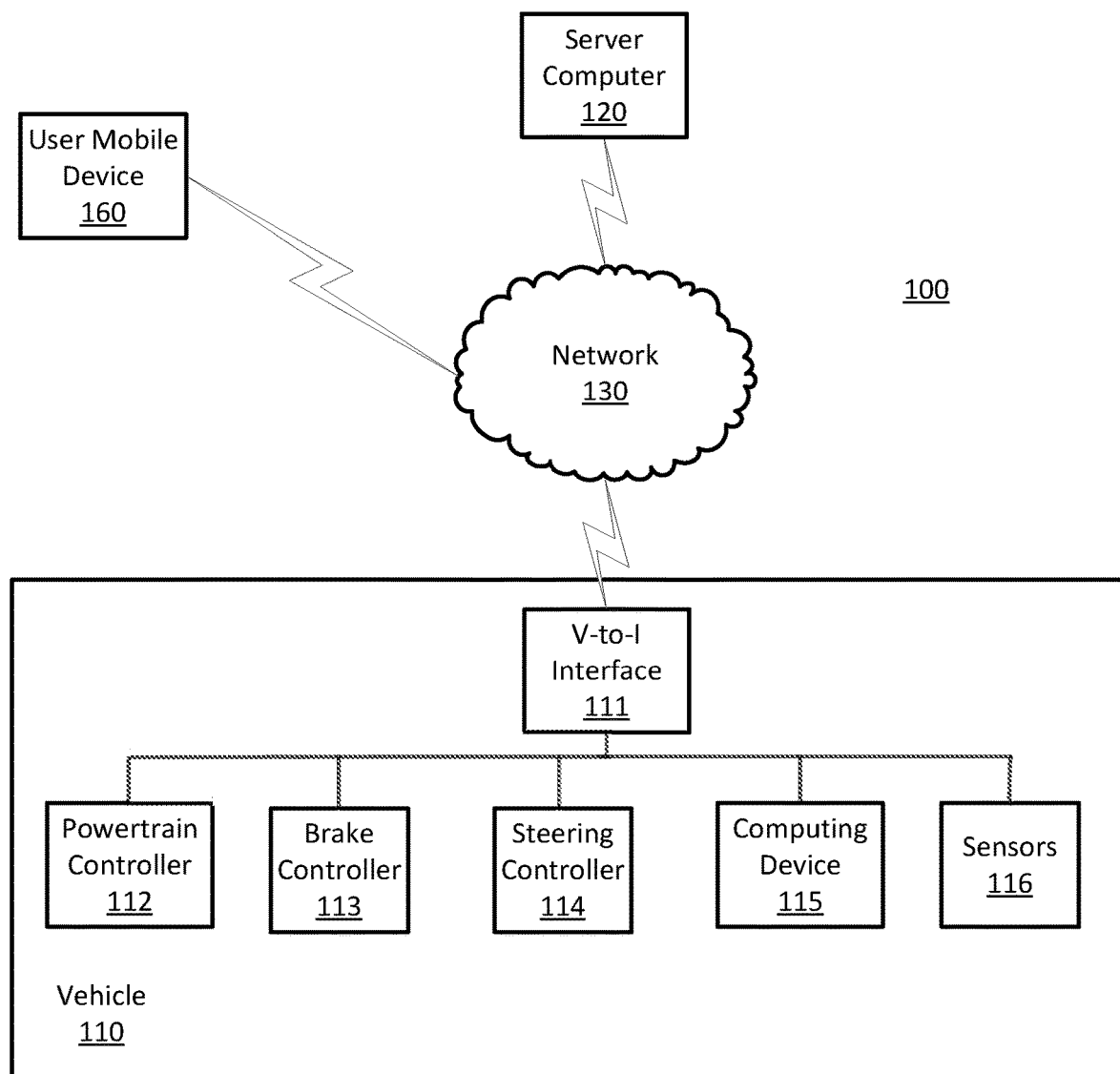
FIG. 1 is a block diagram of an example vehicle.

Disclosed herein is a method, comprising, upon determining that a location of a vehicle is within a set of boundaries associated with a wireless network and that a user device is authenticated to the wireless network, authorize the user device to control the vehicle, and, upon determining that the location of the vehicle is outside the set of boundaries, authorize the user device to control the vehicle based on requesting and receiving an authorization certificate. The wireless network can be a Wi-Fi network operative to communicate within in a second set of boundaries that includes the set of boundaries. The location of the vehicle is determined by latitude, longitude, and altitude. The location of the vehicle can be compared to a geo-fenced boundary defined by the set of boundaries to determine whether the location of the vehicle is within the set of boundaries. The user device can be authorized to control the vehicle for at most a predetermined period of time, wherein the period of time can be between ½ hour and eight hours.

Upon determining that the location of the vehicle is not within the set of boundaries, authorization of the user device to control the vehicle can be rescinded. The user device can control the vehicle based on requesting and receiving an authorization certificate prior to rescinding authorization of the user device, wherein the authorization certificate is received from transmitted to a server via a wide area network operative to communicate outside of the set of boundaries, wherein the wide area network is a cellular network, satellite network or mesh network and wherein the authentication credential includes user identification and a password. Control of the vehicle can include actuation of one or more vehicle components including steering, powertrain, and braking. The authentication credential can be compared to an authentication credential received by a service controller, wherein the authentication credential is encrypted.

Further disclosed is a computer readable medium storing program instructions for executing some or all of the above method steps. Further disclosed is a computer programmed for executing some or all of the above method steps, including a computer apparatus, programmed to, upon determining that a location of a vehicle is within a set of boundaries associated with a wireless network and that a user device is authenticated to the wireless network, authorize the user device to control the vehicle, and, upon determining that the location of the vehicle is outside the set of boundaries, authorize the user device to control the vehicle based on requesting and receiving an authorization certificate. The wireless network can be a Wi-Fi network operative to communicate within in a second set of boundaries that includes the set of boundaries. The location of the vehicle is determined by latitude, longitude, and altitude. The computer can be further programmed to compare the location of the vehicle to a geo-fenced boundary defined by the set of boundaries to determine whether the location of the vehicle is within the set of boundaries. The user device can be authorized to control the vehicle for at most a predetermined period of time, wherein the period of time can be between ½ hour and eight hours.

The computer can be further programmed to, upon determining that the location of the vehicle is not within the set of boundaries, rescind authorization of the user device to control the vehicle. The computer can be further programmed to authorize the user device to control the vehicle based on requesting and receiving an authorization certificate prior to rescinding authorization of the user device, wherein the authorization certificate is received from and transmitted to a server via a wide area network operative to communicate outside of the set of boundaries, wherein the wide area network is a cellular network, satellite network or mesh network and wherein the authentication credential includes user identification and a password. Control of the vehicle can include actuation of one or more vehicle components including steering, powertrain, and braking. The authentication credential can be compared to an authentication credential received by a service controller, wherein the authentication credential is encrypted.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

FIG. 1 is a diagram of a vehicle information system 100 that includes a vehicle 110 operable in autonomous ("autonomous" by itself in this disclosure means "fully autonomous") and occupant piloted (also referred to as nonautonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

A vehicle 110 capable of autonomous operation can have conventional controls for operation by a human, for example a steering wheel, brake pedal, accelerator pedal, and on/off key switch, button, etc. In other cases, a vehicle 110 capable of autonomous operation can be configured without traditional controls, since in these cases occupants are not expected or not allowed to control the vehicle 110. The vehicle 110 can be programmed to travel a fixed route, like a shuttle bus, or receive a destination from a third party, for example the occupant, and travel to the destination without further input from the occupant, for example. No control input from the occupant is required, and traditional controls can therefore represent unnecessary expense and unnecessary opportunity for unwanted occupant control of the vehicle 110. A vehicle 110 without traditional controls can represent a deterrent to vehicle 110 theft, for example.

In a vehicle 110 without conventional controls, it can be advantageous to permit a user to control vehicle 110 by actuating steering, powertrain and braking by entering directions via a service controller to move a vehicle 110. For example, a vehicle 110 can be often grouped with other vehicles 110 for periods of time, during which it can be advantageous to move one or more of the vehicles 110. Examples include, parking vehicles 110, servicing vehicles 110 and transporting vehicles 110. Parking a vehicle 110 can include moving a vehicle 110 from a current location to a parking location and moving a vehicle from a parking location to a current location. The parking locations can be in a parking lot or parking structure, for example. A current location can be outside of the parking lot or parking structure or within the parking lot or parking structure.

Servicing a vehicle 110 can include performing fueling, charging, diagnostics, test, repairs, upgrades and cleaning, etc. to vehicle 110, for example. Servicing a vehicle 110 can include moving vehicle 110 from a parking location to one or more service locations, servicing the vehicle 110 at each service location, and then moving vehicle 110 back to a parking location. Transporting a vehicle 110 can include moving a vehicle from a parking location to a transport vehicle 110, operative to transport a vehicle 110, and moving vehicle 110 from a transport vehicle 110 to a parking location. Examples include vehicle transport truck/trailers and tow trucks.

Directing a vehicle 110 to accomplish these parking, service and transport moves autonomously can require accurate, timely and detailed location and information regarding the locations of the vehicle 110, the parking locations, the service locations and the transport locations to plot paths for moving a vehicle 110 between the locations safely. Since multiple moving vehicles 110 can be involved, the path information can change at any time including due to the presence of other vehicles. Moving a vehicle 110 for parking, servicing or transporting can be advantageously be accomplished by equipping a user with a service controller to control steering, powertrain and braking for a vehicle 110 to permit a user to select the path.

Figure 2:
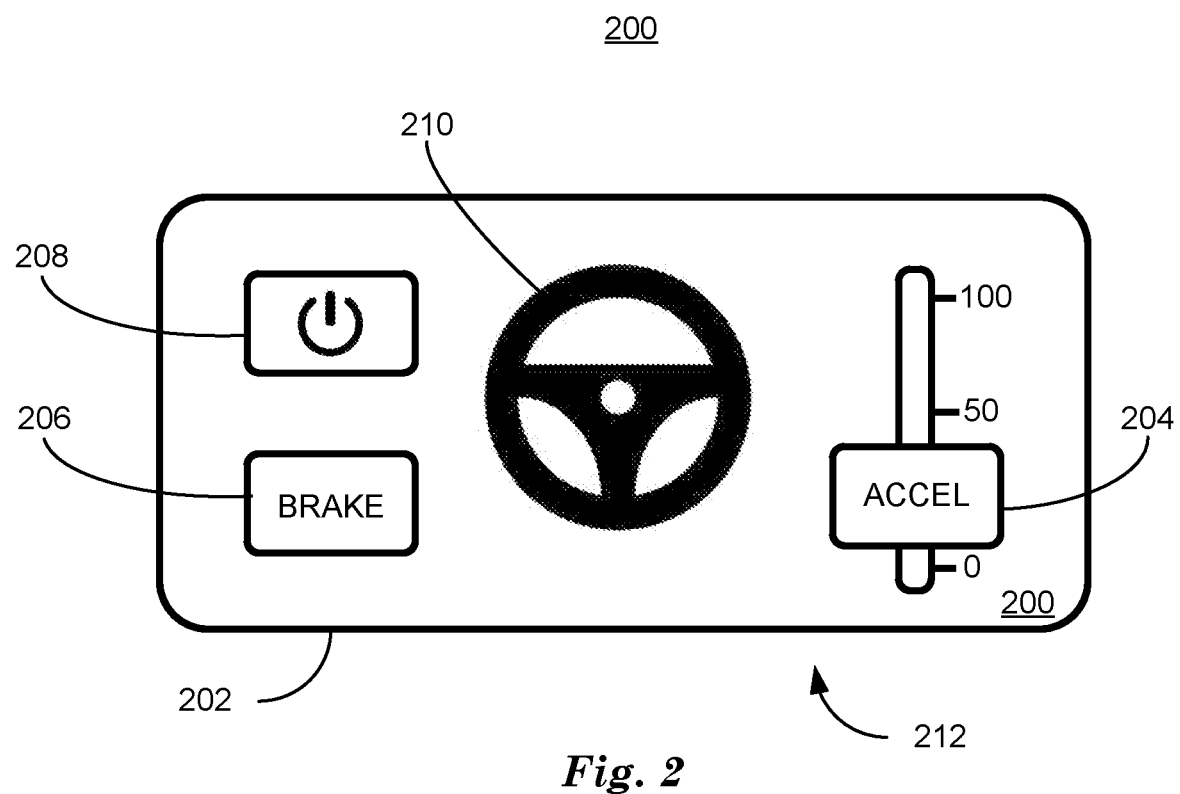
FIG. 2 is a diagram of an example service controller.

FIG. 2 is a diagram of a service controller 200. Service controller 200 can be a hand-held computing device configured to communicate directly with a vehicle 110, e.g., with a computer 115, via a short-distance network such as BLUETOOTH™ as discussed above in relation to FIG. 1. A service controller 200 can communicate with a vehicle 110 via short-distance network to transmit directions regarding vehicle 110 steering, powertrain, and braking, and receive information regarding vehicle 110 status and operation. A service controller 200 can thereby permit a user to pilot a vehicle 110 as if the vehicle 110 were equipped with traditional controls. Service controller 200 can permit a user to actuate vehicle 110 steering, powertrain and braking in addition to autonomous piloting mode of vehicle 110.

An example service controller 200 can be configured with a touch-screen display 202 that can display icons 212 representing conventional controls, such as accelerator pedal icon 204, brake pedal icon 206, on/off switch icon 208 and steering wheel icon 210. Manipulating icons 212 can simulate the operation of traditional controls by receiving input via the touch screen display 202 and transmitting data representing the input to a computing device 115 in vehicle 110. The service controller 200 can update the touch screen display 202 to provide visual feedback to a user. For example, touching the steering wheel icon 210 can cause the service controller 200 to transmit steering data to computing device 115 via a short-distance network which can direct steering controller 114 to move vehicle 110 wheels proportional to the input from touch screen display 202. The steering wheel icon 210 icon can then be updated to show the direction of vehicle 110 wheels, for example. In other examples, a service controller 200 can be configured with physical devices that represent the traditional vehicle controls, such as buttons, switches, rotary potentiometers, and joy sticks, etc. in addition to or instead of icons 212 on a touch screen display 202 for example. In other examples, a service controller 200 can be built into displays or controls included in a vehicle 110 and execute on computing device 115 operating in a service mode, for example.

Figure 3:
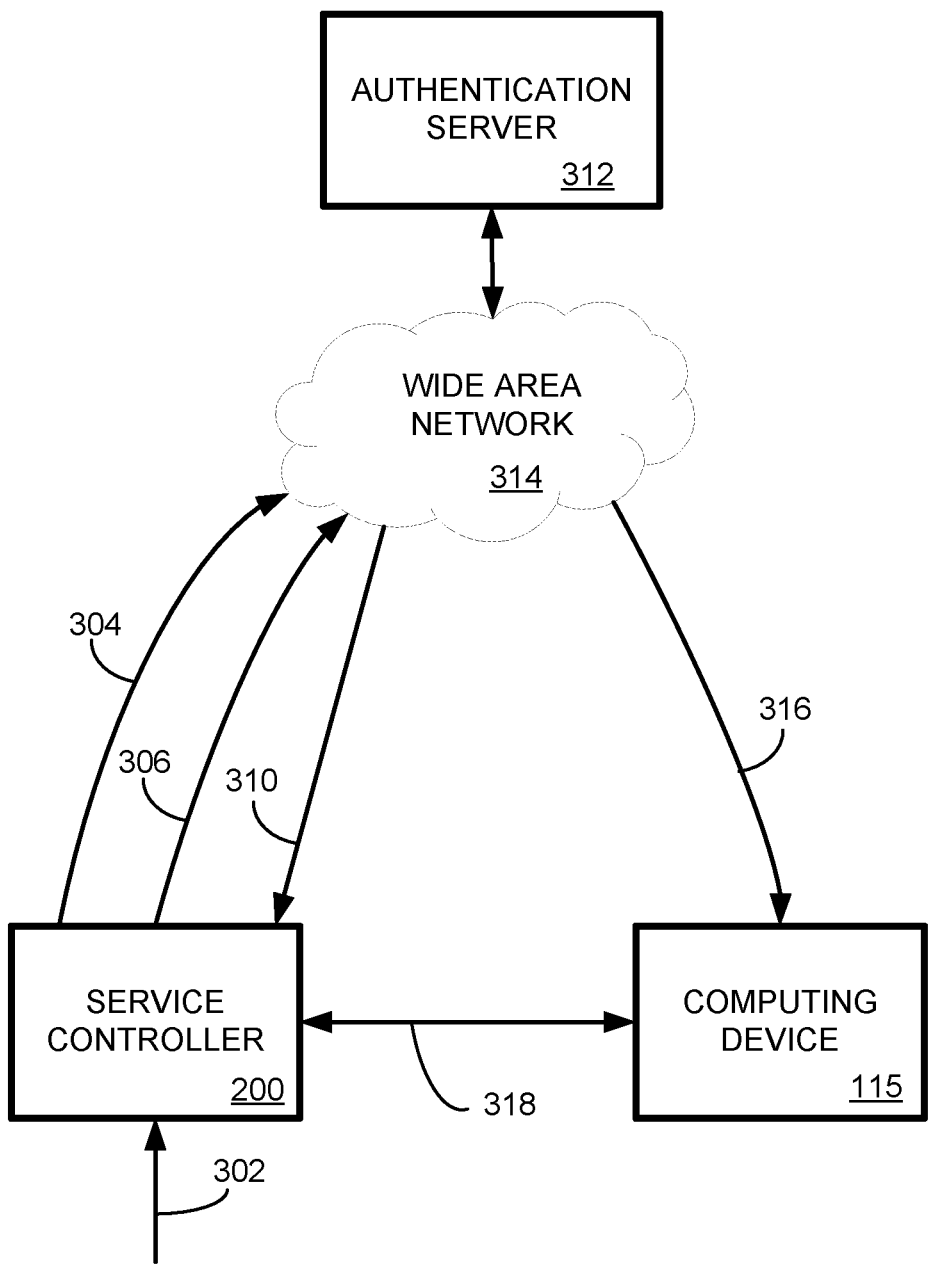
FIG. 3 is a diagram of an example service controller communicating with a computing device in a vehicle via a wide area network.

FIG. 3 is a diagram of a service controller 200, and a computing device 115 in a vehicle 110 both communicating with an authentication server 312 via a wide area network (WAN) 314. Since a service controller 200 can control a vehicle 110, the service controller 200 can be configured to require authentication in a similar fashion to the authentication required of an occupant being transported by a vehicle 110 to provide security and accountability. Without a wide area network 314 based authentication server 312 to implement a security system, a service controller 200 could possibly be used to unlawfully move a vehicle, for example. Service controller 200 and computing device 115 in vehicle 110 can communicate with server 312 via wide area network 314 to confirm authorization for the service controller 200 to control the vehicle 110. The service controller 200 can first establish a short-distance network connection 318 with a computing device 115 in a vehicle 110 via a short-distance network as discussed above in relation to FIG. 2. This short-distance network connection 318 permits service controller 200 to transmit security and control information to computing device 115 and receive status and operating information from computing device 115.

To control vehicle 110, service controller 200 can first input user authentication data 302 from a user. The user authentication data 302 can include user identification (user ID) and a password, an electronic identifier like a key fob, or biometric identifiers like retinal scanning, or facial or fingerprint identification, for example. Service controller 200 can transmit a request for credentials 304 along with the service controller authentication data 306 to an authentication server 312 via WAN 314. The request for credentials 304 can identify the service controller 200 to the authentication server 312, establishing accountability, for example. The WAN 314 can be based on networks having a large coverage area, like a cellular network, a satellite network, or a mesh network. The WAN 314 is defined as a network that covers a dispersed geographic area, i.e., by definition a greater geographic area than could be covered by a WiFi or other local network, e.g., more than 500 feet (or possibly more with use of repeaters) and that covers more than a single possible user location, e.g., a single premises such as a vehicle storage facility. The WAN 314 can require large-area network coverage since requests for authentication can come from anywhere that vehicle 110 can reasonably be expected to operate. Cellular telephone networks can be used to provide WAN 314 and can operate anywhere cellular networks operate, like cellular telephones. Satellite networks operate nearly everywhere globally, but may require additional transmitting and receiving equipment, including an antenna operative to communicate with a satellite. Mesh networks are networks wherein individual networked computing devices are configured as nodes to store and forward network messages, thereby forming peer-to-peer network connections that can be aggregated to operate as one much larger network. Mesh networks can operate in areas without cellular service, and do not require additional antennas like satellite networks, since they can be implemented using terrestrial networks like Wi-Fi for example. Mesh networks can use fixed locations or movable locations such as vehicles 110, aerial drones or balloons.

The request for credentials 304 can include data that identifies the service controller 200 to the authentication server 312, to permit the authentication server 312 to correctly identify service controller 200. This can prevent un-authorized (e.g. stolen) service controllers from being used to control a vehicle 110, for example. The service controller 200 can also transmit service controller authentication data 306 including input user ID and password to authentication server 312. Authentication server 312 can receive the request for credentials 304 and service controller authentication data 306 and determine that a valid user has input valid authentication data 302 to a known service controller 200 and return an authorization certificate 310 to the service controller 200 via the WAN 314.

An authorization certificate 310 is digital data that can be transferred between computing devices like authentication server 312 and computing device 115 and service controller 200 via a network like WAN 314 for purposes including communicating security information. The authorization certificate can include encryption, for example, to permit a receiving computing device to securely verify the identity of the sender and determine that the authorization certificate is valid. Receipt of a valid authorization certificate from a verified sender permits a computing device 115 and service controller 200 to determine that they are properly authorized permit control of vehicle 110 by service controller 200 by a valid authentication server 312. The authentication server 312 can also transmit an authentication certificate 316 to the computing device 115 in the vehicle 110, to permit the computing device 115 to confirm that the service controller 200 is properly authorized and vehicle 110 can be controlled via short-distance network 318 by comparing the authorization certificates 310, 316 and requiring a match. In other examples, short-distance network 318 can be replaced with an electronic cable, thereby requiring a physical connection between service controller 200 and vehicle 110. In other examples, service controller 200 can be included in vehicle 110.

An example of a service controller 200 being used to control a vehicle 110 in this fashion can be in cases where a vehicle 110 encounters a problem while operating. For example, if sensors 116 are found by computing device 115 to be operating at less than 99.99% probability of reporting correct results, computing device 115 can direct vehicle 110 to park at the nearest safe location and report the problem via the WAN 314 to alert server 312 that assistance is needed at which location. A service vehicle 110 including a tow truck, for example, can be dispatched to the location along with a service controller. At the location, a user can apply for and receive an authentication certificate 310 for the service controller 200 and the computing device 115 in the vehicle 110 to permit the user to pilot the vehicle 110 to a service or parking location or onto a tow truck for transport. Since this can occur anywhere the vehicle 110 can operate, a WAN 314 is required to handle the communications. As discussed above, strong security is required for service. This can provide adequate strong security but also can mean significant wait times for authorization as extensive security routines are executed on large databases.

Figure 4:
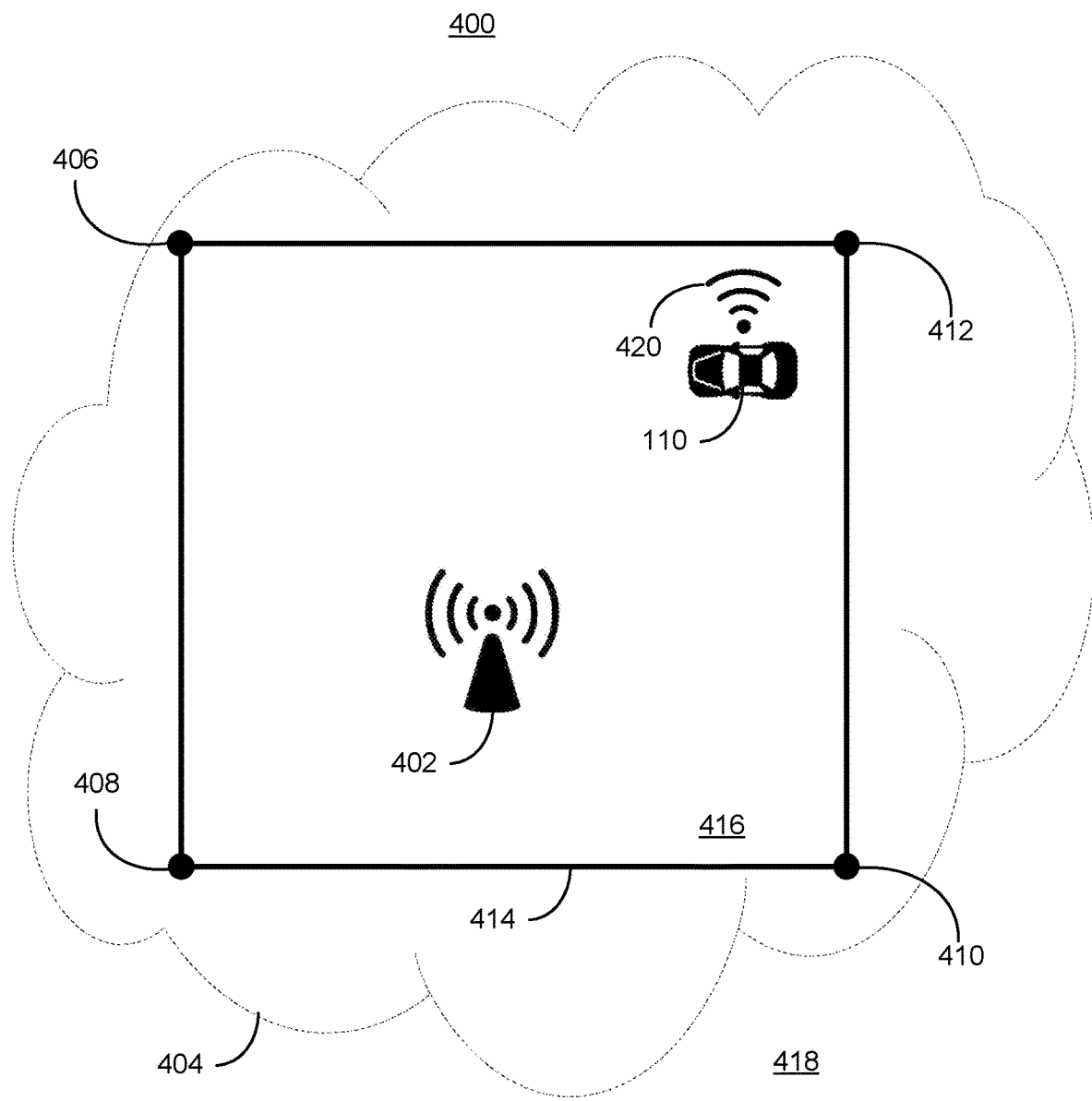
FIG. 4 is a is a diagram of an example vehicle in a set of boundary locations.

FIG. 4 is a diagram of a geo-fenced vehicle yard 400. Geo-fencing is a technique for establishing a boundary based on geographic location. In geo-fencing, boundary locations 406, 408, 410, 412 are defined in terms of geographic locations, for example latitude and longitude coordinates. A list of boundary locations 406, 408, 410, 412 can be connected to form a geo-fence boundary 414 that defines an interior region 416 and an exterior region 418. The geo-fenced vehicle yard 400 can include a Wi-Fi interface 402, which can be an interface to a local area network (LAN). Wi-Fi interface 402 can provide communications between a yard server computing device and a computing device 115 in vehicle 110 having a Wi-Fi interface 420. Wi-Fi interface 402 can form a local area network such as Wi-Fi network 404 within which Wi-Fi interface 402 is operative to communicate with a computing device 115 in vehicle 110 via Wi-Fi interface 420. Wi-Fi network 404 can include boundary locations 406, 408, 410, 412 and therefore include geo-fenced boundary 414. By communicating boundary locations 406, 408, 410, 412 to computing device 115 in vehicle 110, computing device 115 can determine whether vehicle 110 is in the interior region 416 or exterior region 418 of geo-fenced boundary 414. The network 404 is described herein as a WiFi network but in general refers to a local area network, i.e., a network with restricted geographic reach, e.g., not beyond a radius of a wireless router's transmission range (possibly with repeaters), e.g., 500 feet, a specified premises, etc.

Figure 5:
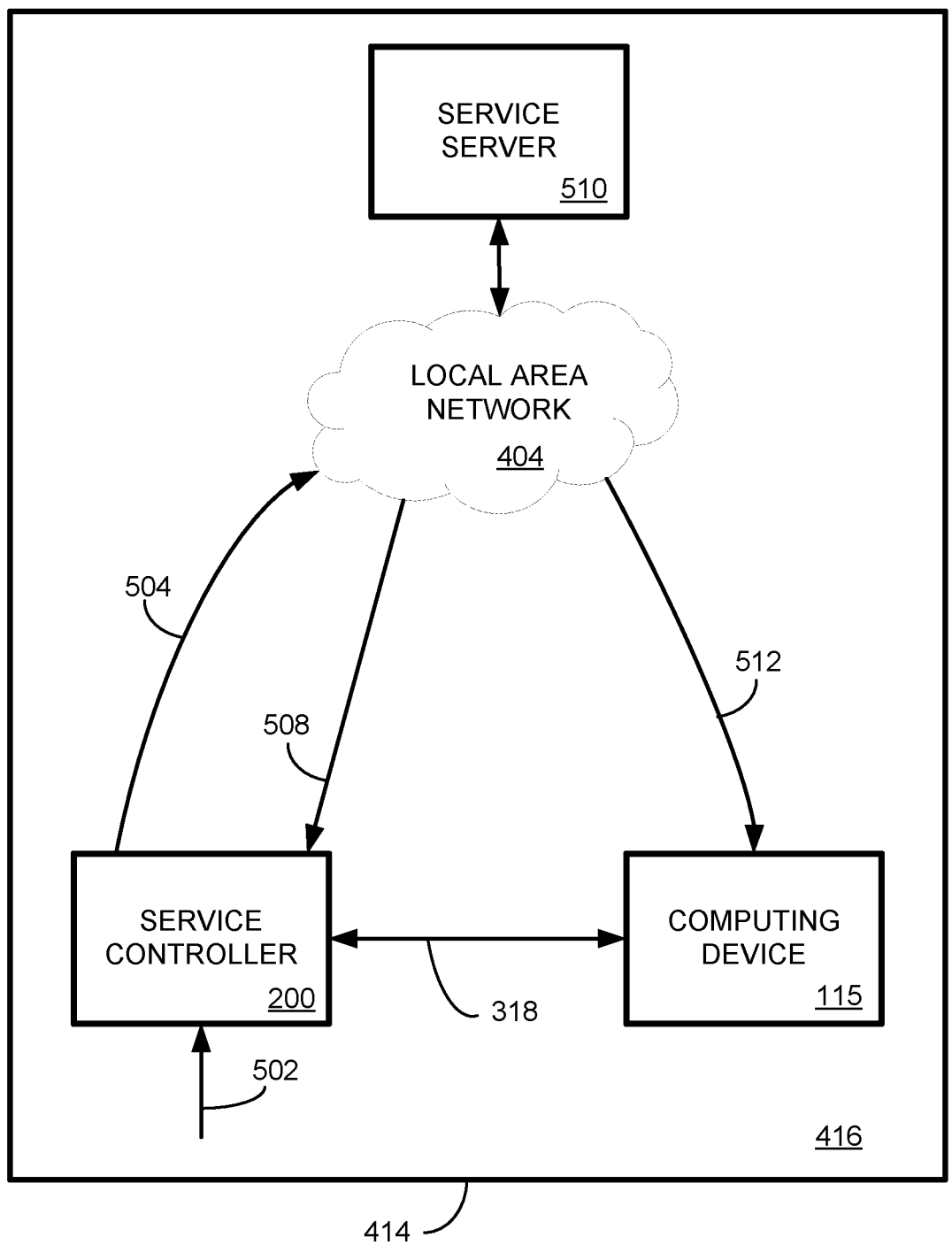
FIG. 5 is a diagram of an example service controller communicating with a computing device in a vehicle via a local area network.

FIG. 5 is a diagram of a service controller 200, a computing device 115 in a vehicle 110 both communicating with a service server 510 via Wi-Fi network 404. In this example, vehicle 110 is in the interior region 416 of geo-fenced boundary 414. As discussed above in relation to FIG. 4, computing device 115 can determine that vehicle 110 in in the interior region 416 and is therefore within geo-fenced boundary 414. Once service controller 200 receives information that vehicle 110 is within geo-fenced boundary 414 via a short-distance network 318, for example, a user can be permitted to enter a user ID and password 502 into service controller 200, to be transmitted as user authentication data 504 to a service server 510 via Wi-Fi network 404. Once authenticated by service server 510, service server 510 can transmit Wi-Fi verification 508. Service controller 510 can also transmit Wi-Fi verification 512 to computing device 115 in vehicle 110. Once computing device 115 is each in receipt of matching Wi-Fi verifications 508, 512, service controller 200 can receive permission to transmit vehicle control data to computing device 115 and receive status and operational data, thereby permitting service controller 200 to control vehicle 110.

Receiving Wi-Fi authorization 508, 512 via a Wi-Fi network 404 can occur more quickly and represent a lower level of security than receiving authentication certificates 310, 316 via a WAN as discussed in relation to FIG. 3. By "level of security" this disclosure means a level of assurance that a security mechanism provides, a lower level of security equating to less assurance, i.e., a greater level of concern about the possibility of a security breach. A lower level of security is acceptable since Wi-Fi authorization 508, 512 is dependent upon being within a geo-fenced boundary 414. In some examples, Wi-Fi authorization 508, 512 can be granted to service controller 200 and vehicle 110 for a predetermined period of time, meaning that service controller 200 could be removed from vehicle 110, receive Wi-Fi authorization 508 to control a second vehicle 110, and return to control the first vehicle 110, without re-transmitting user authentication data 504 and receiving Wi-Fi authorization 508, 512 as long as the time period has not expired. The predetermined period of time can range from about ½ hour to a full work day (8 hours), for example. This can permit a user with a single service controller 200 to efficiently control a plurality of vehicles within a geo-fenced boundary 414.

In examples where a vehicle 110 being controlled by a service controller 200 based on Wi-Fi authorization 508, 512 and the vehicle travels from an interior region 416 of a geo-fenced boundary 414 to an exterior region 418 of a geo-fenced boundary 414, computing device 115 can require that Wi-Fi authorization 508, 512 be replaced by authorization certificates 310, 316 received from an authentication server 312 via a WAN 314. In this example, computing device 115 can detect that vehicle 110 has exited a geo-fenced boundary 414 and automatically rescind Wi-Fi authorization 508, 512, thereby preventing controller 220 from controlling vehicle 110. In this case, computing device 115 can direct vehicle 110 to safely park at the earliest opportunity. To make the transition from Wi-Fi authorization 508, 516 to authorization certificate 310, 316 based authorization when a vehicle 110 travels from within a geo-fenced boundary 414 to outside a geo-fenced boundary, computing device 115 can send a message to service controller 200 instructing the service controller 200 to transmit request for credentials 304 and service controller authentication data 306 to authentication server 312 via a WAN 314. By requesting WAN 314 based authorization before service server 510 automatically rescinds Wi-Fi authorization, service controller 200 can continue to control vehicle 110 with minimal disruption when being piloted from within a geo-fenced boundary 414 to outside a geo-fenced boundary 414, while maintaining uninterrupted security.

Figure 6:
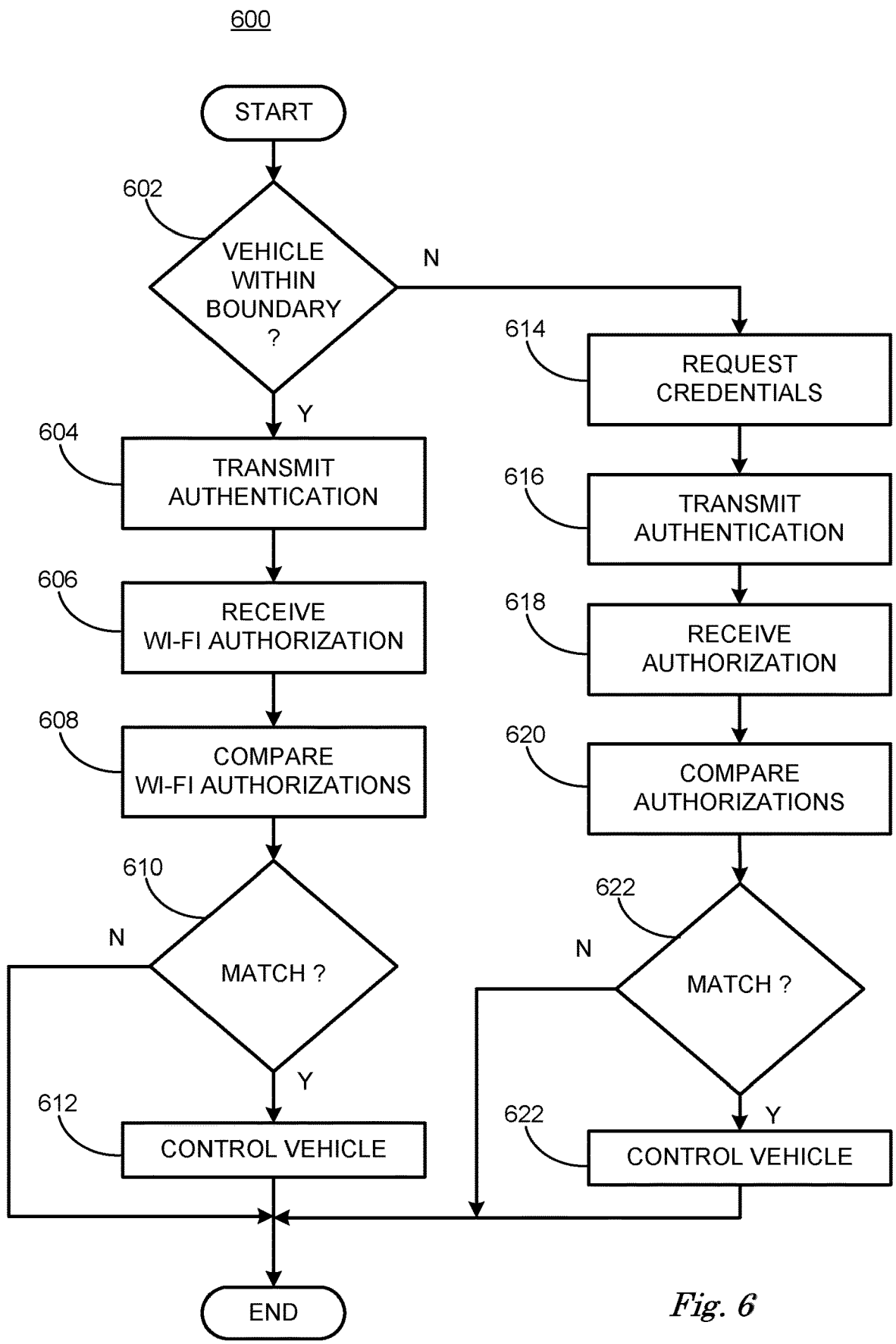
FIG. 6 is a flowchart diagram of an example process to authorize a service controller.

FIG. 6 is a diagram of a flowchart, described in relation to FIGS. 1-5, of a process 600 for authorizing a service controller 200 to control a vehicle 110. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602, where a computing device 115 in a vehicle 110 can determine whether a location of a vehicle 110 is within a geo-fenced boundary as discussed above in relation to FIGS. 4 and 5. Vehicle 110 can use sensors 116, including GPS and V-to-I Interface 111, including cell-based geo-location, for example, to determine the location of the vehicle 110. The location of the vehicle 110 can be represented as latitude, longitude and altitude, where latitude and longitude are geographic coordinates specifying the location of a point on Earth in degrees, minutes and seconds, and altitude specifies the elevation of a point in meters with respect to a predetermined circumference of the Earth at that point. By specifying values for latitude, longitude and altitude, the location of a point can be uniquely determined with respect to the Earth. Computing device 115 in vehicle 110 can access GPS data and 3D accelerometer data via sensors 116, coupled with mapping data from V-to-I Interface 111, for example, to determine latitude, longitude and altitude with respect to geo-fenced boundary 414. Once computing device 115 has determined latitude, longitude and altitude, these values can be compared to boundary locations 406, 408, 410, 412 associated with geo-fenced boundary 414 to determine whether vehicle 110 is within geo-fenced boundary 414 by techniques of 3D geometry, e.g., as are known.

When vehicle 110 is within boundary locations 406, 408, 410, 412, process 600 branches to step 604, where computing device 115 can inform service controller 200 that vehicle 110 is within boundary locations 406, 408, 410, 412. Service controller 200 can transmit authentication data 504 to a service server 510 via a Wi-Fi network 404 having network coverage that is operative to communicate with service controller 200 and vehicle 110 when the service controller 200 and the vehicle 110 are within the geo-fenced boundary 414 formed by boundary locations 406, 408, 410, 412. At step 606 service controller 200 can receive Wi-Fi authorization 508 from a service server 510 via the Wi-Fi network 404. Service server 510 can also transmit Wi-Fi authorization 512 to computing device 115.

At step 608 service controller 200 can compare the received Wi-Fi authorization 508 with Wi-Fi authorization 512 received by computing device 115 to determine if the service controller 200 is authorized for the vehicle 110 by communicating with the computing device 115 via short-distance communications 318, for example. Computing device 115 can compare received Wi-Fi authorization 512 with Wi-Fi authorization 508 received by service controller 200 to determine proper authorization. At step 610, if Wi-Fi authorizations match, process 600 branches to step 612, where service controller 200 is permitted to control vehicle 110. At step 610, if Wi-Fi authorizations do not match, service controller 200 is not permitted to control vehicle 110 and process 600 ends.

Returning to step 602, if service controller 200 determines that vehicle 110 is not within geo-fenced boundary 414, service controller 200 can request authorization credential from an authentication server 312 via a WAN 314. This represents an additional level of security over the security represented by steps 604, 606, 608 and 610, since service controller 200 has determined that vehicle 110 is not within a geo-fenced boundary 414. This level of security that securely identifies the service controller 200 and the vehicle 110 is not required when vehicle 110 is known to be within a geo-fenced boundary 414.

Following the step 614, at step 616 service controller 200 can transmit a user ID and password to an authentication server 312 via a WAN 314, for example, to identify a user. Assuming that authentication server 312 determines that service controller 200, vehicle 110 and a user are known to the authentication server 312 and that service controller 200 control of vehicle 110 by the user is appropriate, at step 618 service controller can receive authorization certificate 310 from authentication server 312 via a WAN 314. At step 620 service controller 200 can compare the authorization certificate 310 with an authorization certificate 316 received by computing device 115 in vehicle 110. Authorization certificates 310, 316 can also be compared by computing device 115. At step 622, if authorization certificates 310, 316 match, process 600 branches to step 622, where service controller 200 can control vehicle 110 as discussed above in relation to FIG. 2. At step 622, if authorization certificates 310, 316 do not match, service controller 200 is denied permission to control vehicle 110 and process 600 ends.

Figure 7:
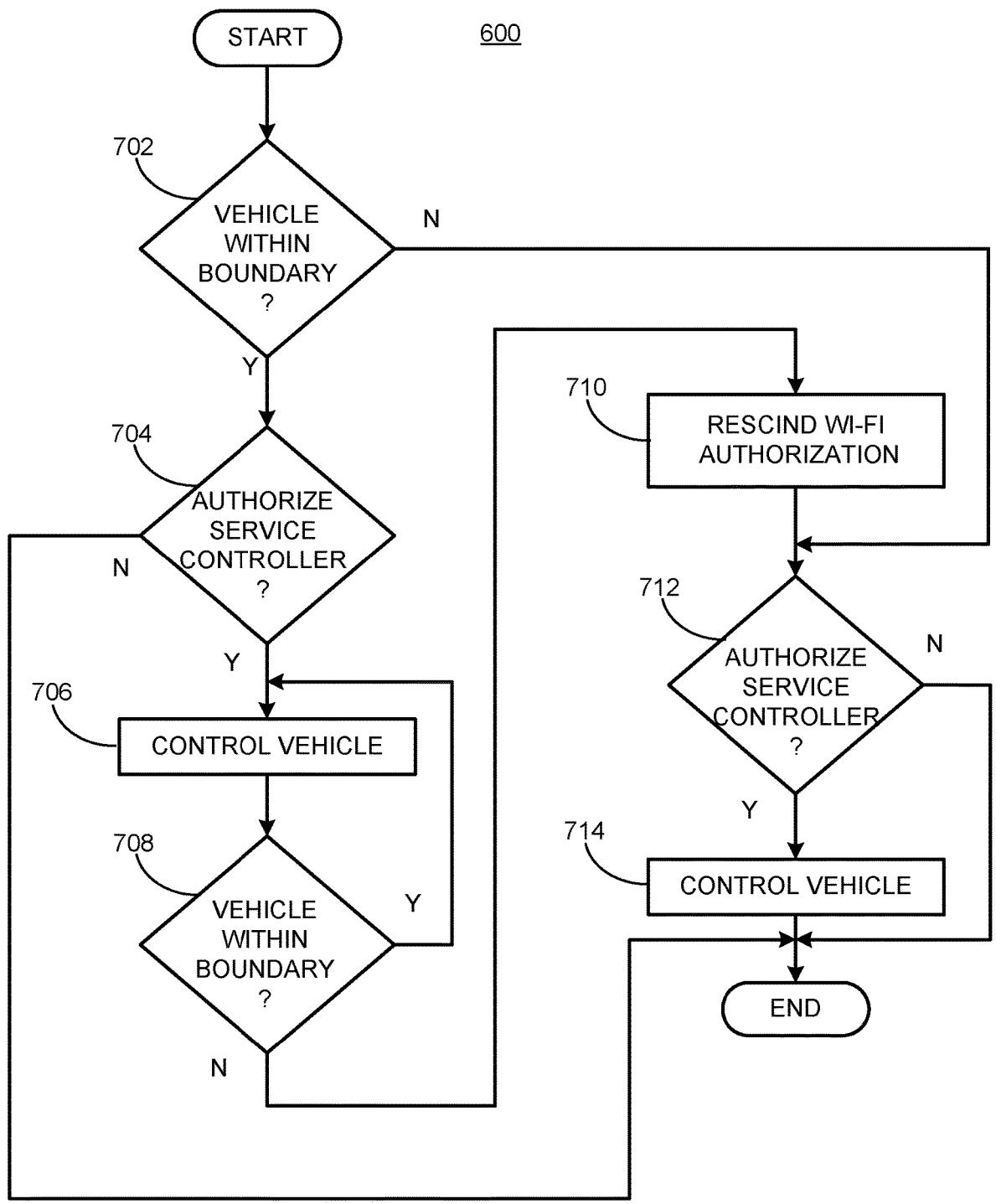
FIG. 7 is a flowchart diagram of an example process to authorize a service controller.

FIG. 7 is a diagram of a flowchart, described in relation to FIGS. 1-6, of a process 700 for authorizing a service controller 200 to control a vehicle 110. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders.

Process 700 begins at step 702, where service controller 200 can determine whether vehicle 110 is within boundary locations 406, 408, 410, 412, and therefore within geo-fenced boundary 414 as discussed above in relation to FIGS. 4-6. When service controller 200 determines that vehicle 110 is within geo-fenced boundary 414, process 700 branches to step 704, where service controller 200 can be authorized by a service server 510 via a Wi-Fi network 404 according to steps 604, 606, 608 and 610 of process 600. If service controller is authorized at step 704, process 700 branches to step 706, where service controller 200 is authorized to control vehicle 110. At step 704, when service controller fails to be authorized by a service server 510 via a Wi-Fi network 404, process 700 ends. Following step 706, while service controller 200 is controlling vehicle 110, at step 708 service controller re-checks the location of vehicle 110 to determine if vehicle 110 remains within geo-fenced boundary 414. This is because vehicle 110 is being piloted by a user with a service controller 200 and therefore can be piloted so as to travel outside of geo-fenced boundary 414.

At step 708, when service controller determines that vehicle 110 is within geo-fenced boundary 414, process 700 returns to step 706, where service controller 200 can continue to control vehicle 110. At step 708, when service controller determines that vehicle 110 is no longer within geo-fenced boundary 414, process 700 passes to step 710, where service controller 200 rescinds Wi-Fi authorization and service controller 200 is no longer permitted to control vehicle 110. Following step 710, at step 712 service controller 200 can obtain authorization to control vehicle 110 by receiving an authorization certificate 310 from an authentication server 312 via a WAN 314 and comparing it to an authorization certificate 316 received by a computing device 115 in vehicle 110 as described in relation to steps 614, 616, 618, 620 and 622 of process 600. If service controller 200 receives authorization at step 712, at step 714 service controller 200 can control vehicle 110 as described in relation to FIG. 2. If service controller 200 does not receive authorization to control vehicle 110 at step 712, process 700 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A computer, comprising a processor and a memory, the memory storing instructions executable by the processor such that the computer is programmed to:
establish a first network connection from a service controller to the computer, wherein the first network connection is a direct connection to the computer, wherein the computer is in a vehicle and the service controller is configured to control at least one of vehicle speed or heading via the first network connection;
upon determining that a location of the vehicle is within a set of boundaries within which authorization of control of the vehicle via a wireless local area network is permitted, and receiving a first authorization certificate by which the service controller is authenticated to the wireless local area network, authorize the service controller to control the vehicle via the wireless local area network; and
then, after determining that the location of the vehicle has moved outside the set of boundaries within which control of the vehicle by the service controller is permitted based on authorization via the wireless local area network,
rescind authorization to control the vehicle based on the vehicle being outside the set of boundaries,
request a second authorization certificate via a wireless wide area network, and
upon receiving the second authorization certificate via the wireless wide area network, wherein the second authorization certificate authorizes the service controller, via the wireless wide area network, to control the vehicle outside the set of boundaries, controlling the vehicle outside the set of boundaries by the service controller via the first network connection.

2. The computer of claim 1, wherein the wireless network is a Wi-Fi network operative to communicate within a second set of boundaries defining an area larger than and including the set of boundaries.

3. The computer of claim 1, wherein the location of the vehicle is determined by latitude, longitude, and altitude.

4. The computer of claim 3, further programmed to compare the location of the vehicle to a geo-fenced boundary defined by the set of boundaries to determine whether the location of the vehicle is within the set of boundaries.

5. The computer of claim 1, wherein the user device, after being authenticated to the wireless local area network, is authorized to control a plurality of vehicles including the vehicle for a predetermined period of time.

6. The computer of claim 1, further programmed to, after determining that the location of the vehicle is not within the set of boundaries, rescind authorization of the user device to control the vehicle.

7. The computer of claim 1, wherein the authorization certificate is and received from transmitted to a server via a wide area network operative to communicate outside of the set of boundaries.

8. The computer of claim 7, wherein the wide area network is a cellular network, satellite network or mesh network.

9. The computer of claim 1, wherein the authentication credential includes user identification and a password.

10. The computer of claim 1, wherein control of the vehicle includes actuation of one or more vehicle components including steering, powertrain, and braking.

11. The computer of claim 1, wherein the first network connection is a short-range wireless connection or a physical connection.

12. An apparatus, comprising a service controller for a vehicle, the service controller including a processor and a memory, the memory storing instructions executable by the processor such that the service controller is programmed to:
establish a first network connection from the service controller to a computer, wherein the first network connection is a direct connection to the computer, wherein the computer is in a vehicle and the service controller is configured to control at least one of vehicle speed or heading via the first network connection;
upon determining that a location of the vehicle is within a set of boundaries within which authorization is permitted, via a wireless local area network, for the service controller to control the vehicle, transmit a first authentication credential to a first authentication server via the wireless local area network;
then, after determining that the location of the vehicle has moved outside the set of boundaries within which authorization of control of the vehicle via the wireless local area network is permitted, transmit a second authentication credential to a second authentication server via a wide area wireless network requesting authorization to control the vehicle outside the set of boundaries; and
upon receiving authentication from one of the first and second authentication servers, permit actuation of one or more vehicle components according to control by the service controller via the first network connection.

13. The apparatus of claim 12, wherein the first authentication credential includes a user identification and a password.

14. The apparatus of claim 12, further programmed to permit actuation of the one or more vehicle components including steering, powertrain, and braking.

15. The apparatus of claim 12, further programmed, upon receiving authentication from the second authentication server, to permit actuation of the one or more vehicle components by the service controller.

16. The apparatus of claim 12, wherein the location of the vehicle is received from a computer in the vehicle.

17. The apparatus of claim 12, further programmed, upon receiving authentication from the first authentication server, to permit actuation of the one or more vehicle components by the service controller for a predetermined period of time.

18. The apparatus of claim 12, wherein the first network connection is a short-range wireless connection or a physical connection.

19. A method, comprising:
establishing a first network connection from a service controller to a computer, wherein the first network connection is a direct connection to the computer, wherein the computer is in a vehicle and the service controller is configured to control at least one of vehicle speed or heading via the first network connection;
upon determining that a location of the vehicle is within a set of boundaries within which authorization is permitted, via a wireless local area network, for the service controller to control the vehicle, transmitting a first authentication credential to a first authentication server via the wireless local area network;
determining that the location of the vehicle has moved outside the set of boundaries within which authorization of control of the vehicle via the wireless local area network is permitted;
transmitting a second authentication credential to a second authentication server via a wide area wireless network requesting authorization to control the vehicle outside the set of boundaries; and upon receiving authentication from one of the first and second authentication servers, permitting actuation of one or more vehicle components according to control by the service controller via the first network connection.

\* \* \* \* \*